United States Patent
Temple, III (12)

(10) Patent No.: US 6,615,281 B1
(45) Date of Patent: Sep. 2, 2003

(54) MULTI-NODE SYNCHRONIZATION USING GLOBAL TIMING SOURCE AND INTERRUPTS FOLLOWING ANTICIPATORY WAIT STATE

(75) Inventor: Joseph L. Temple, III, Hurley, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/565,393

(22) Filed: May 5, 2000

(51) Int. Cl.[7] .............................................. G06F 1/12
(52) U.S. Cl. ....................................... 709/400; 713/502
(58) Field of Search .......................... 709/400; 713/400, 713/500, 502, 600

(56) References Cited

U.S. PATENT DOCUMENTS

| | | | | |
|---|---|---|---|---|
| 4,503,497 | A | 3/1985 | Krygowski et al. | 364/200 |
| 5,083,265 | A | 1/1992 | Valiant | 395/800 |
| 5,086,500 | A | 2/1992 | Greub | 395/550 |
| 5,113,523 | A | 5/1992 | Colley et al. | 395/800 |
| 5,192,882 | A | 3/1993 | Lipovski | 307/471 |
| 5,241,543 | A | 8/1993 | Amada et al. | 370/100.1 |
| 5,261,067 | A | 11/1993 | Whelan | 395/425 |
| 5,276,828 | A | 1/1994 | Dion | 395/425 |
| 5,307,381 | A | 4/1994 | Ahuja | 375/107 |
| 5,329,630 | A | 7/1994 | Baldwin | 395/425 |
| 5,361,277 | A | 11/1994 | Grover | 375/107 |
| 5,384,906 | A * | 1/1995 | Horst | 709/400 |
| 5,448,732 | A * | 9/1995 | Matsumoto | 709/104 |
| 5,502,819 | A | 3/1996 | Aldrich et al. | 395/200.19 |
| 5,778,221 | A | 7/1998 | Temple | 395/591 |
| 5,923,855 | A * | 7/1999 | Yamazaki | 709/248 |
| 5,968,135 | A * | 10/1999 | Teramoto et al. | 709/400 |
| 5,978,838 | A * | 11/1999 | Mohamed et al. | 709/208 |

FOREIGN PATENT DOCUMENTS

DE  42 21 278 A1  6/1992  .......... G06F/15/16

OTHER PUBLICATIONS

Harper, IBM Technical Disclosure Bulletin, vol. 32 No. 12, 5/90, Method of Keeping and Synchronizing Time in a Message–Passing Distributed System, pp 422–425.

* cited by examiner

Primary Examiner—Dennis M. Butler
(74) Attorney, Agent, or Firm—Floyd A. Gonzalez, Esq.; Marc A. Ehrlich, Esq.; Heslin Rothenberg Farley & Mesiti P.C.

(57) ABSTRACT

Synchronization "states" of programmable length imposed on processing nodes are disclosed, the last of which contains an event requiring action by fully synchronized nodes. The nodes are shifted between the states using a shared timing source to ensure synchronization for the event. The first state is a "non-impending event" state where the nodes continue their routine processing; the second state is an "impending event state" closer to the event, and within which nodes "wait" for the event by suspending their routine processing. In the third state, immediately preceding the final, event state, any non-waiting nodes are interrupted for the impending event. The present invention therefore allows some node autonomy during the first state within which the nodes poll at their leisure, and during the second, "wait" state, but during the third, interrupt state, any nodes not yet arriving by polling are interrupted.

38 Claims, 4 Drawing Sheets

MULTI-NODE SYNCHRONIZATION USING GLOBAL TIMING SOURCE AND INTERRUPTS FOLLOWING ANTICIPATORY WAIT STATE

TECHNICAL FIELD

The present invention relates to processing systems. More particularly, the present invention relates to multiple-node processing systems (e.g., parallel processing systems) in which the nodes require synchronization for events such as communication of processing results.

BACKGROUND OF THE INVENTION

Massive cache machines ("MCMs") and other parallel processing systems require tightly synchronized nodes to share data synchronously, regardless of the type of compute model used. For example, in tightly-coupled single instruction multiple data ("SIMD") system models, each node runs the same instruction from a common source, but operates on its own data. In the more loosely-coupled multiple instruction multiple data ("MIMD") system model, each node independently runs its own instructions on its own data. With reference to FIG. 1, such computer systems 100 may include parallel CPU processing nodes 101a . . . 101n, commonly coupled by a bus 104 to, for example, an interrupt control unit 103 and/or a storage unit 102.

The "compute" modes discussed above are usually accompanied by "communicate" modes during which the results of the computations must be communicated between the nodes. However, the nodes may be ready to communicate at different times, out of synchronization. Node synchronization is therefore usually required regardless of the type of compute mode employed.

To effect the required communication, without perfect synchronization, data buffering can be used on storage unit 102. The writing node deposits its data in a buffer, to be read later by the reading node. The problems with this approach are well-known, and include buffer space limitations, buffer deadlock, and extra read/write cycles.

Nodes can also be required to poll memory locations or registers that have values controlling synchronization. Polling, however, requires extra processing cycles, which can become excessive if all nodes are required to continuously poll for synchronization during their otherwise routine processing tasks.

Interrupts can also be used to synchronize nodes. However, interrupting a node from its routine processing creates problems, such as requiring the reading node to perform a context switch from its compute mode to its communicate mode. A context switch occasioned by an interrupt can be costly in terms of lost processing time, and can also interrupt critical processing.

In the previously issued, commonly assigned U.S. Pat. No. 5,778,221 entitled "System for Executing Asynchronous Branch and Link in Parallel Processor," (incorporated herein by reference in its entirety) a technique for a lighter-weight context switch is disclosed, triggered by a "special interrupt." That patent discusses easing the costs of a context switch, but the problem of issuing the interrupt triggering the context switch remains. Improved synchronization techniques are still required to generate interrupts only when absolutely needed, and to minimize their effects on ongoing processing.

SUMMARY OF THE INVENTION

The above problems are addressed, and further advantages are provided, by the present invention which in one aspect is a method and system for synchronizing at least two processing nodes for an event. At least one state counter indicates at least two states including a first, non-impending event state within which nodes polling the state counter continue routine processing; and a second, impending event state within which nodes polling the state counter suspend routine processing to wait for the impending event. A stimulus source shifts the state counter between the at least two states; and an interrupt means is provided for generating an interrupt to synchronize non-waiting nodes for the event.

Nodes may refrain from further polling during the first, non-impending event state; but may poll while waiting during the second, impending event state.

The stimulus source may comprise a timing source, and a timing counter receiving transitions from the timing source, counting to respective, programmable state lengths, and shifting the state counter between its respective states. A respective state counter may be provided in each processing node, stimulated by a stimulus source shared by the processing nodes.

Additional states may be imposed, including a third, interrupt state at the end of which the interrupt is generated; and a fourth, event state within which the event occurs.

The synchronization technique of the present invention is particularly useful for synchronizing parallel processing nodes for the communication of processing results, but can be used for any arbitrary event for which node synchronization is necessary.

By providing the synchronized states of the present invention, which change the operation of the nodes from routine processing to waiting as the event approaches, a balance is struck between harsh, asynchronous interrupts and excessive polling. Here, interrupts are used to interrupt non-waiting nodes only, and nodes which "arrived" during the impending event state are spared interruption and wait for the event by, e.g., polling during that time.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following detailed description of the preferred embodiment(s) and the accompanying drawings in which:

DETAILED DESCRIPTION OF THE PREFERRED EMBODIMENT(S)

Figure 1:
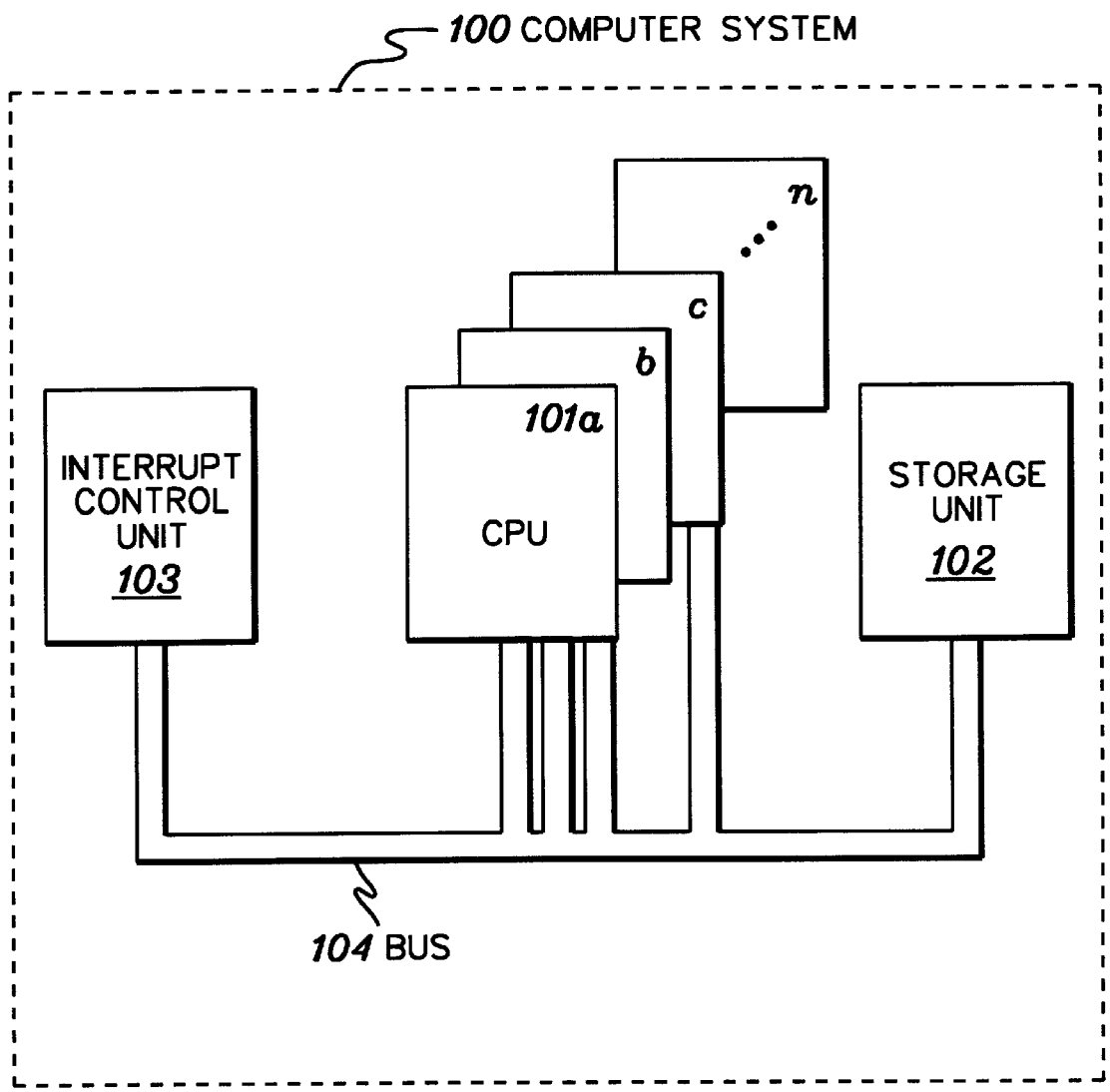
FIG. 1 depicts a parallel computer system having multiple nodes requiring synchronization for events.

As discussed above, the present invention is directed to a technique for synchronizing nodes of a processing system for events such as communication between the nodes. FIG. 1 depicts a system 100 having processing nodes 101a . . . 101n requiring synchronization. (The term "node" is used broadly herein to connote any identifiable combination of hardware and/or software requiring synchronization for an event.)

Figure 2:
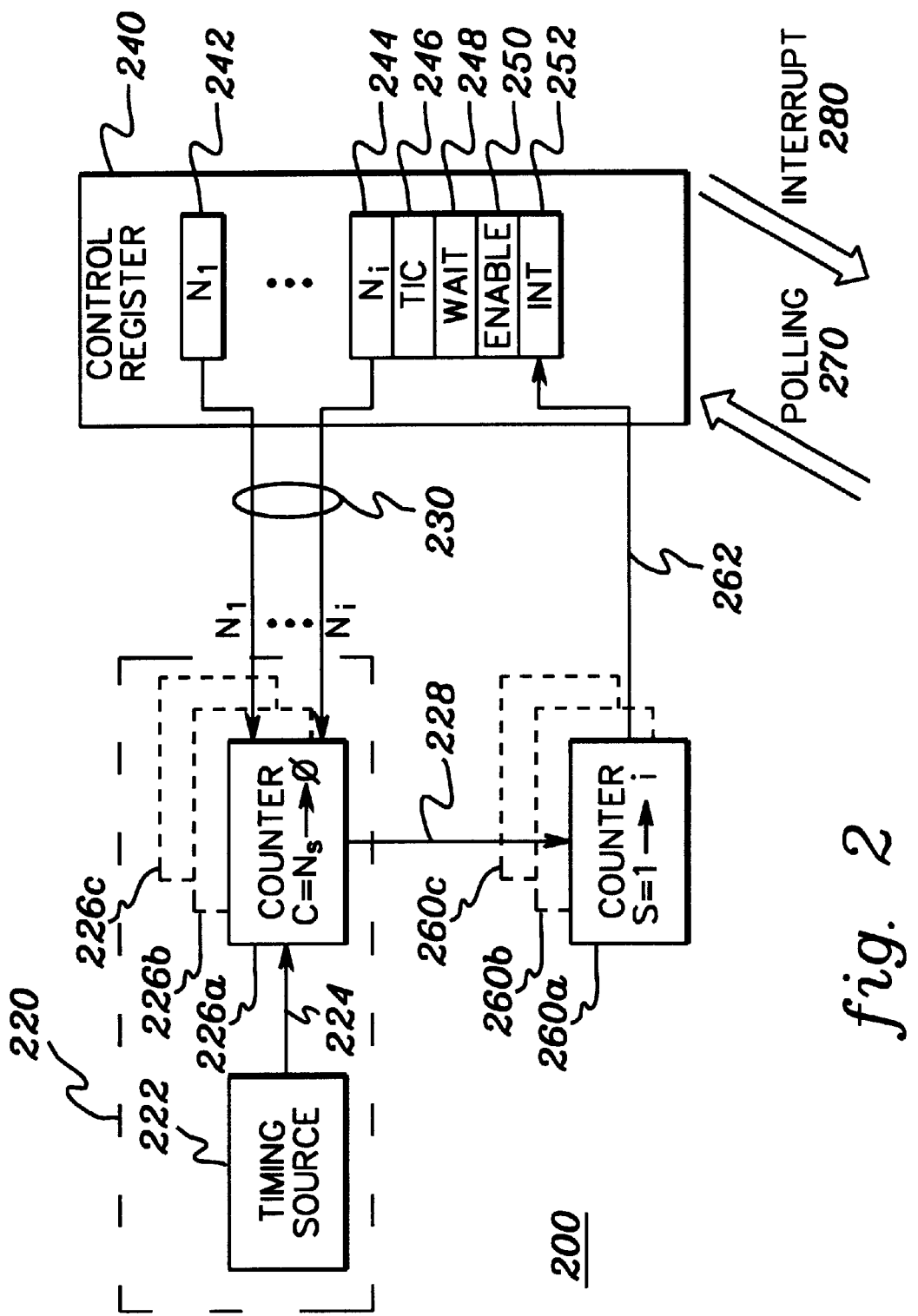
FIG. 2 depicts an exemplary system in accordance with the present invention for shifting nodes between states using a timing source and counters.
Figure 3:
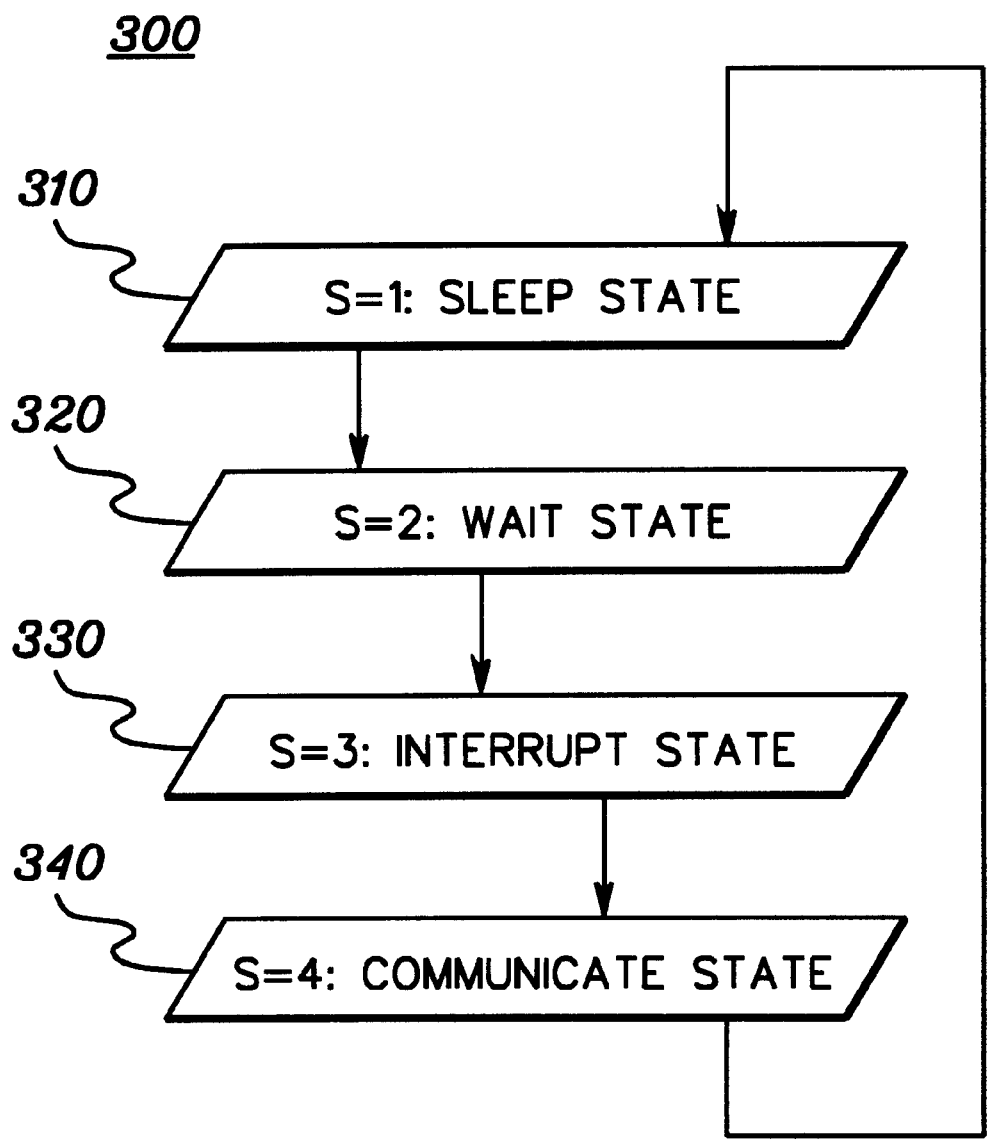
FIG. 3 is a state transition diagram of the four states of the present invention.
Figure 4:
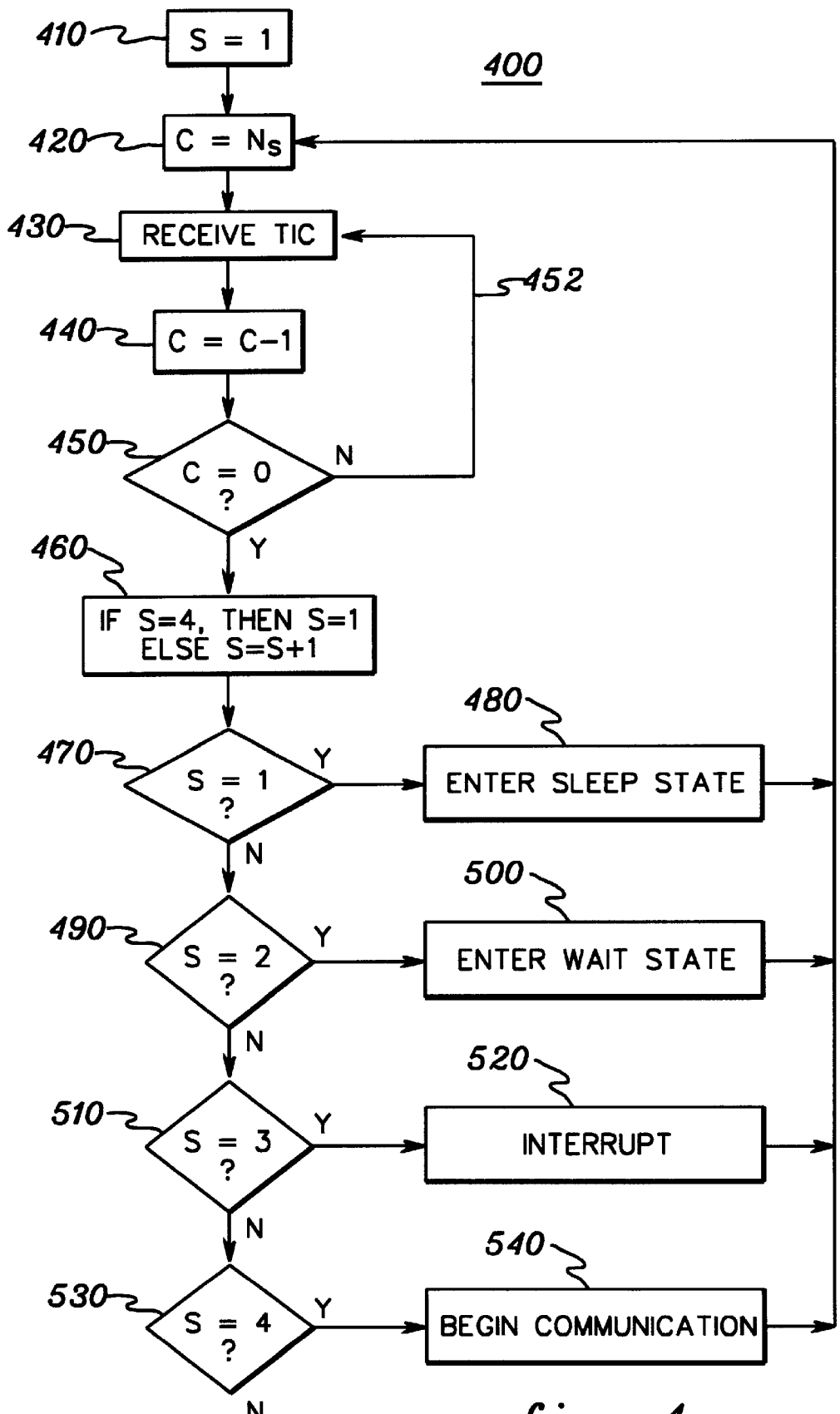
FIG. 4 is a flow diagram depicting the operation of counters of the present invention as they shift between the states of the present invention.

The present invention is directed to a system 200 (FIG. 2), and associated methods, data structures and program code, arranged and programmed to implement the methods 300, 400 (FIGS. 3–4). In general, the technique of the present invention involves synchronization "states" of programmable length imposed on the nodes, the last of which (e.g., state 4) contains the event. The nodes are shifted between the states using a shared timing source to ensure synchronization when the event occurs. The first state is a "non-impending event" state where the nodes continue their routine processing; the second state is an "impending event state" closer to the event, and within which nodes "wait" for the event by suspending their routine processing. In the third state, immediately preceding the final, event state, any non-waiting nodes are interrupted for the impending event. The present invention therefore allows some node autonomy during the first state within which the nodes poll at their leisure, and during the second, "wait" state, but during the third, interrupt state, any nodes not yet arriving by polling are interrupted.

With reference to the system of FIG. 2, a stimulus source 220 is programmed by a control source 240 to shift at least one state counter 260 sequentially between states of programmable length, defined in the state transition diagram 300 of FIG. 3 as:

State 310: "Sleep" state (non-impending event state) within which any node polling the state counter continues its routine processing. The nodes may optionally refrain from further polling, knowing that they will be interrupted for the event in a later state. The interrupt is masked during this state. (The term "polling" is used broadly herein to connote any checking of a data location by a node.)

State 320: "Wait" state (impending event state) within which any nodes polling the state counter suspend their routine processing and wait for the event state by continued polling. This state starts at least two interrupt latencies before the beginning of the final, event state. The interrupt remains masked during this state.

State 330: "Interrupt" state within which any non-waiting nodes are interrupted. The interrupt is unmasked. This state lasts slightly longer than one interrupt latency.

State 340: "Event" state within which the event occurs. The length of this window must be shorter than any I/O timeout period, but long enough for a polling loop to complete.

The exemplary hardware of FIG. 2 can be used to impose the above states and associated operations in accordance with the present invention. State counter 260*a* increments from state S=1 thru state S=i. For the above set of states, e=4. This state counter indicates the current state to the associated node. (Counters 260*a* . . . 260*c* and 226*a* . . . 226*c* are shown, which can each be located in a respective node. Alternatively, single counters can be used and shared between nodes, depending on implementation requirements. Those skilled in the art will recognize that any/all of the hardware in FIG. 2 can be shared by the nodes, or replicated on individual nodes, assuming that the communication resources exist to ensure data equivalence across the nodes.)

State counter 260*a* is shifted 228 between its states by stimulus source 220, which may include a timing source 222 and timing counter 226*a*. Timing source 222 may be shared across nodes (e.g., Vulcan Timer in IBM's R6000SP parallel machine; or the Sysplex timer in IBM's System 390). Transitions ("tics") are provided 224 from the timing source to a downward tic counter 226*a* which is pre-programmed with a state length $N_s$. The counter counts the received tics down from this state length to 0, and then outputs a transition to state counter 260*a*. Each state can have a different, programmable length programmed 230 into timing counter from control register 240, represented as values $N_1$ (242) . . . $N_i$ (244).

State counter 260*a* counts from state 1 thru state i sequentially as it receives transitions from timing counter 226*a*. As discussed above, during the first two states, any nodes polling this register continue routine processing, or wait for the event, respectively. During the third state, interrupt INT (252) is unmasked 262, thereby interrupting any non-waiting nodes.

Those skilled in the art will recognize that the polling operations 270 and interrupt operations 280 are performed using known hardware and/or software, which are omitted here for clarity.

Other fields may be provided the control register 240:
TIC (246): Tunes the rate of the tic signal 224 to which the counter 226*a* responds.
WAIT (248): Defines the operation to be performed upon synchronization.
ENABLE (250): Enables/disables the interrupt.

With reference to the flow diagram of FIG. 4, the real-time operation of the system 200 of FIG. 2 is illustrated. State counter 260*a* begins at S=1 (Step 410), and timer counter 226*a* begins at $C=N_s$ (Step 420), as programmed from control register 240. A tic is received (Step 430) and timer counter 226*a* is decremented accordingly (Step 440). If C=0 (Decision 450), state counter 260*a* is set to 1 if S=4 (i.e., the state is rotated back to 1 following state 4), or else the state is incremented by 1 (Step 460). If C has not reached 0 (Branch 452), state counter 260*a* remains in its current state, and more tics are received (Step 430).

Upon incrementing the state counter 260*a* (Step 460), the system has entered one of its four possible states represented logically by the series of Decisions 470, 490, 510, and 530; followed respectively by entry into the proper states 480, 500, 520 and 540. At the beginning of each of the states, the timing counter is reset to the programmed length $C=N_s$ in Step 420.

Synchronizing for a single program multiple data ("SPMD") communication is now used as an example of the types of operations during the fourth, event state.

Near the beginning of the fourth state, the nodes should begin executing an SPMD interrupt handler entry point. This code reads the state and then executes a synchronous operation. In an MCM this is a fetch broadcast. Completion of these operations brings the nodes into as close as synchronization as the connection fabric allows.

The actual synchronous communication operation is delayed until near the end of the fourth state. Once synchronous SPMD programs are started they need not wait for this state for all communications, but only at critical points. Thus, this synchronizing operation must be distinguishable from other synchronous communications. This can be accomplished by setting the WAIT bit in the control register indicating when the state counter is read. Execution of the synchronizing operation resets the interrupt.

If the system is not being operated by a single user, the SPMD entry point must be to a code which dispatches SPMD or SPSD codes for operation on groups of nodes. This may require setting up an entry point for a second timed SPMD start or it may be a matter branching to appropriate code while remaining in synch. If the SPMD scheduling code can be performed without significant differences between nodes then a re-synch would not be necessary. In essence, the scheduler performs the entry point operation for the application it chooses to dispatch.

The present invention can be implemented in hardware, software, or a combination of both. Partial or full software implementations of the present invention will include computer program products and associated data structures, stored in any type of media (e.g., storage 102 of FIG. 1).

In accordance with the present invention, the interrupts generated herein can be those received by the system in the above-incorporated U.S. Pat. No. 5,778,221, as the "special interrupts" disclosed therein such that the present invention encompasses a combination of the techniques disclosed herein and those disclosed in that patent.

While the invention has been particularly shown and described with reference to preferred embodiment(s) thereof, it will be understood by those skilled in the art that various changes in form and details may be made therein without departing from the spirit and scope of the invention.

What is claimed is:

1. A method for synchronizing at least two processing nodes in a processing system for an event during otherwise routine processing, the processing system including at least one state counter for indicating at least two states to the nodes, the method comprising:
   entering a first, non-impending event state within which nodes polling the state counter continue routine processing;
   entering a second, impending event state within which nodes polling the state counter suspend routine processing to wait for the impending event; and
   issuing an interrupt to synchronize non-waiting nodes for the event.

2. The method of claim 1, further comprising:
   using a timing source shared by the nodes to shift the at least one state counter between said at least two states.

3. The method of claim 2, further comprising:
   imposing respective lengths of said at least two states using a timing counter stimulated by transitions received from the timing source, the timing counter programmed with the respective lengths of said at least two states.

4. The method of claim 1, wherein the at least two states comprises at least three states, the method further comprising:
   entering a third, interrupt state at the end of which said issuing said interrupt occurs.

5. The method of claim 4, wherein the at least three states comprises four states, the method further comprising:
   entering a fourth, event state within which the event occurs.

6. The method of claim 5, further comprising:
   imposing respective lengths of said four states using a timing counter stimulated by transitions received from a timing source, the timing counter programmed with the respective lengths of said four states.

7. The method of claim 6, wherein the event comprises the at least two processing nodes communicating between each other.

8. The method of claim 1, wherein the event comprises the at least two processing nodes communication between each other.

9. The method of claim 1, wherein any nodes polling the state counter during the second, impending event state wait for the impending event by polling until the event occurs.

10. The method of claim 9, wherein nodes polling the state counter during the first, non-impending event state continue routine processing including refraining from further polling until the event occurs.

11. A system for synchronizing at least two processing nodes for an event, comprising:
    at least one state counter indicating at least two states to said processing system, the at least two states including
       a first, non-impending event state within which nodes polling the state counter continue routine processing, and
       a second, impending event state within which nodes polling the state counter suspend routine processing to wait for the impending event;
    a stimulus source for shifting the state counter between the at least two states; and
    interrupt means for generating an interrupt to synchronize non-waiting nodes for the event.

12. The system of claim 11, wherein the stimulus source comprises a timing source.

13. The system of claim 12, wherein the stimulus source further comprises:
    a timing counter receiving transitions from the timing source, counting to respective state lengths, and shifting the state counter between its respective states.

14. The system of claim 11, further comprising a respective state counter in each processing node stimulated by the stimulus source shared by the processing nodes.

15. The system of claim 11, wherein the at least two states indicated by the state counter comprises at least three states, including:
    a third, interrupt state at the end of which said interrupt is generated.

16. The system of claim 15, wherein the at least three states indicated by the state counter comprises four states, including:
    a fourth, event state within which the event occurs.

17. The system of claim 11, further comprising:
    means, in nodes polling the state counter during the second, impending event state, for waiting for the impending event by polling until the event occurs.

18. The system of claim 17, further comprising:
    means, in nodes polling the state counter during the first, non-impending event state, for continuing routine processing including refraining from further polling until the event occurs.

19. A system for synchronizing at least two processing nodes in a processing system for an event during otherwise routine processing, the processing system including at least one state counter for indicating at least two states to the nodes, the system comprising:
    the at least one state counter indicating a first, non-impending event state within which nodes polling the state counter continue routine processing;
    the at least one state counter indicating a second, impending event state within which nodes polling the state counter suspend routine processing to wait for the impending event; and
    means for issuing an interrupt to synchronize non-waiting nodes for the event.

20. The system of claim 19, further comprising:
    a timing source, shared by the nodes, to shift the at least one state counter between said at least two states.

21. The system of claim 20, further comprising:
    at least one timing counter for imposing respective lengths of said at least two states, stimulated by transitions received from the timing source.

22. The system of claim 19, wherein the at least two states comprises at least three states, the system further comprising:

the at least one state counter indicating a third, interrupt state at the end of which said issuing said interrupt occurs.

23. The system of claim 22, wherein the at least three states comprises four states, the system further comprising:

the at least one state counter indicating a fourth, event state within which the event occurs.

24. The system of claim 23, further comprising:

at least one timing counter for imposing respective lengths of said four states, stimulated by transitions received from a timing source shared by the nodes.

25. The system of claim 24, wherein the event comprises the at least two processing nodes communicating between each other.

26. The system of claim 19, wherein the event comprises the at least two processing nodes communication between each other.

27. The system of claim 19, further comprising:

means, in any nodes polling the state counter during the second, impending event state, for waiting for the impending event by polling until the event occurs.

28. The system of claim 27, further comprising:

means, in nodes polling the state counter during the first, non-impending event state, for continuing routine processing including refraining from further polling until the event occurs.

29. An article of manufacture tangibly embodying computer readable program code means system for synchronizing at least two processing nodes in a processing system for an event during otherwise routine processing, the processing system or article of manufacture including at least one state counter for indicating at least two states to the nodes, the article of manufacture comprising:

code means for the at least one state counter indicating a first, non-impending event state within which nodes polling the state counter continue routine processing;

code means for the at least one state counter indicating a second, impending event state within which nodes polling the state counter suspend routine processing to wait for the impending event; and code means for issuing an interrupt to synchronize non-waiting nodes for the event.

30. The article of manufacture of claim 29, further comprising:

code means for a timing source, shared by the nodes, to shift the at least one state counter between said at least two states.

31. The article of manufacture of claim 30, further comprising:

code means for at least one timing counter imposing respective lengths of said at least two states, stimulated by transitions received from the timing source.

32. The article of manufacture of claim 29, wherein the at least two states comprises at least three states, the article of manufacture further comprising:

code means for the at least one state counter indicating a third, interrupt state at the end of which said issuing said interrupt occurs.

33. The article of manufacture of claim 32, wherein the at least three states comprises four states, the article of manufacture further comprising:

code means for the at least one state counter indicating a fourth, event state within which the event occurs.

34. The article of manufacture of claim 33, further comprising:

code means for at least one timing counter imposing respective lengths of said four states, stimulated by transitions received from a timing source shared by the nodes.

35. The article of manufacture of claim 34, wherein the event comprises the at least two processing nodes communicating between each other.

36. The article of manufacture of claim 29, wherein the event comprises the at least two processing nodes communication between each other.

37. The article of manufacture of claim 29, further comprising:

code means, in any nodes polling the state counter during the second, impending event state, for waiting for the impending event by polling until the event occurs.

38. The article of manufacture of claim 37, further comprising:

code means, in nodes polling the state counter during the first, non-impending event state, for continuing routine processing including refraining from further polling until the event occurs.

* * * * *